No. 799,095. PATENTED SEPT. 12, 1905.
R. L. SHRINER.
BOTTLE CAPPING MACHINE.
APPLICATION FILED SEPT. 30, 1902.

9 SHEETS—SHEET 3.

No. 799,095. PATENTED SEPT. 12, 1905.
R. L. SHRINER.
BOTTLE CAPPING MACHINE.
APPLICATION FILED SEPT. 30, 1902.
9 SHEETS—SHEET 5.

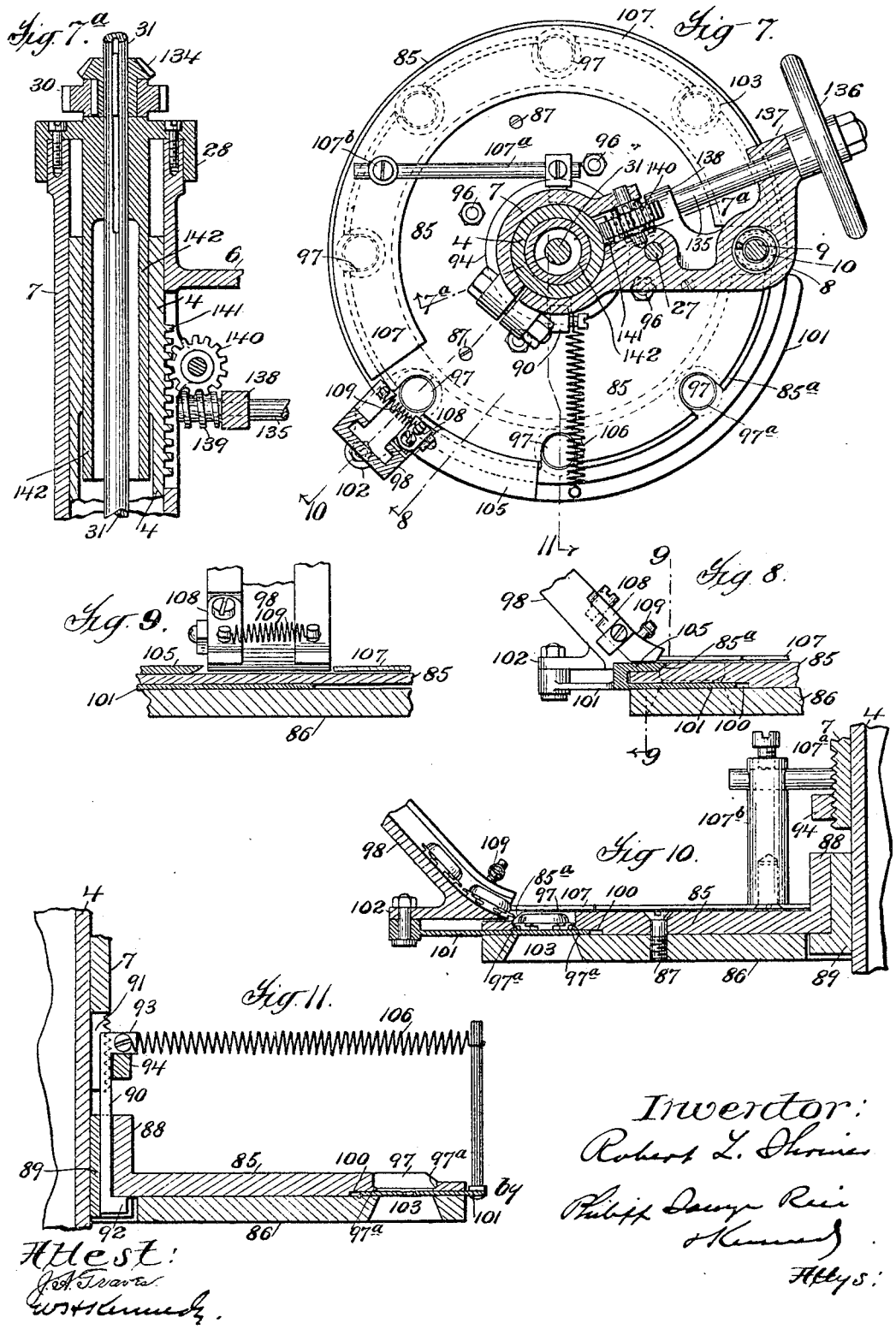

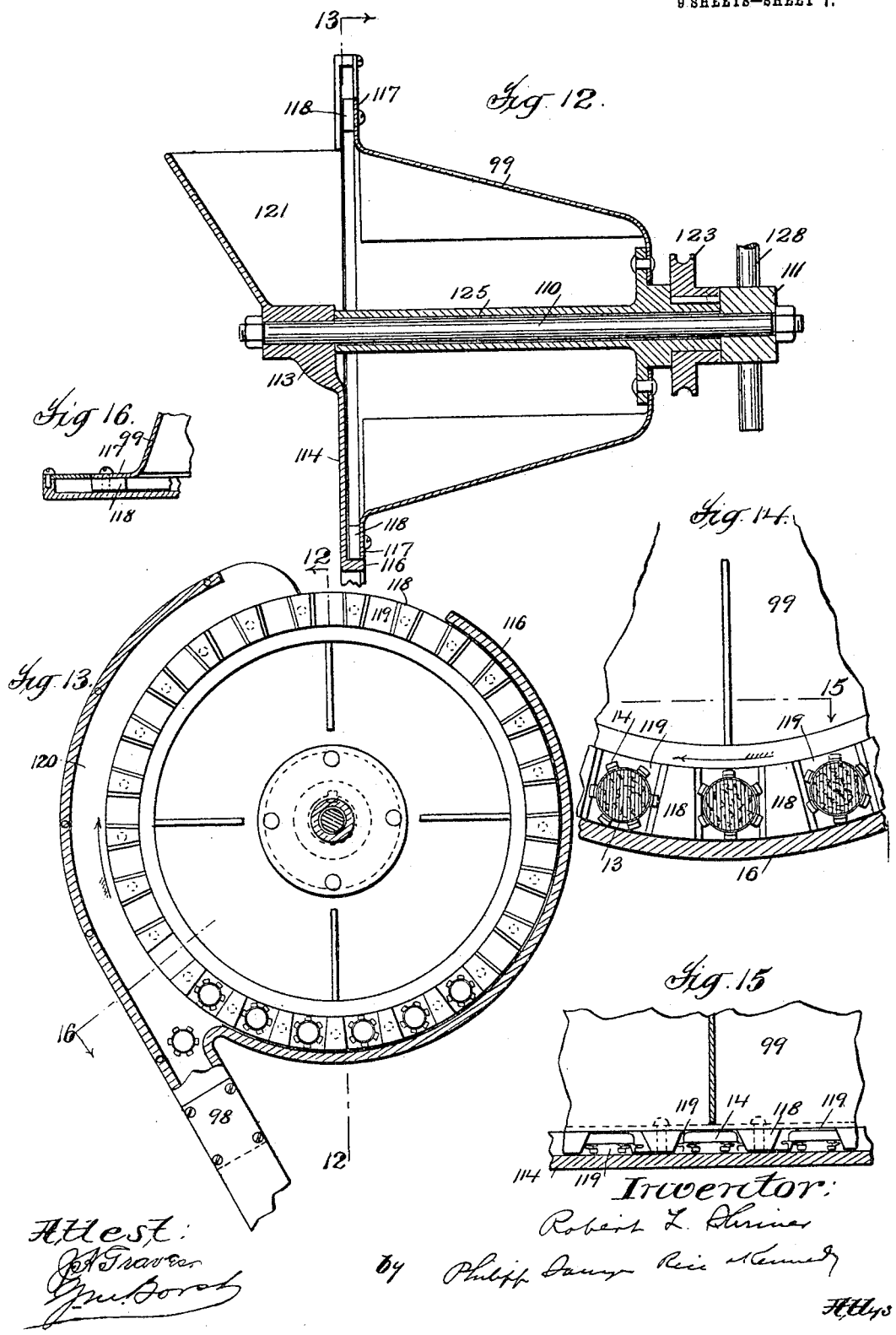

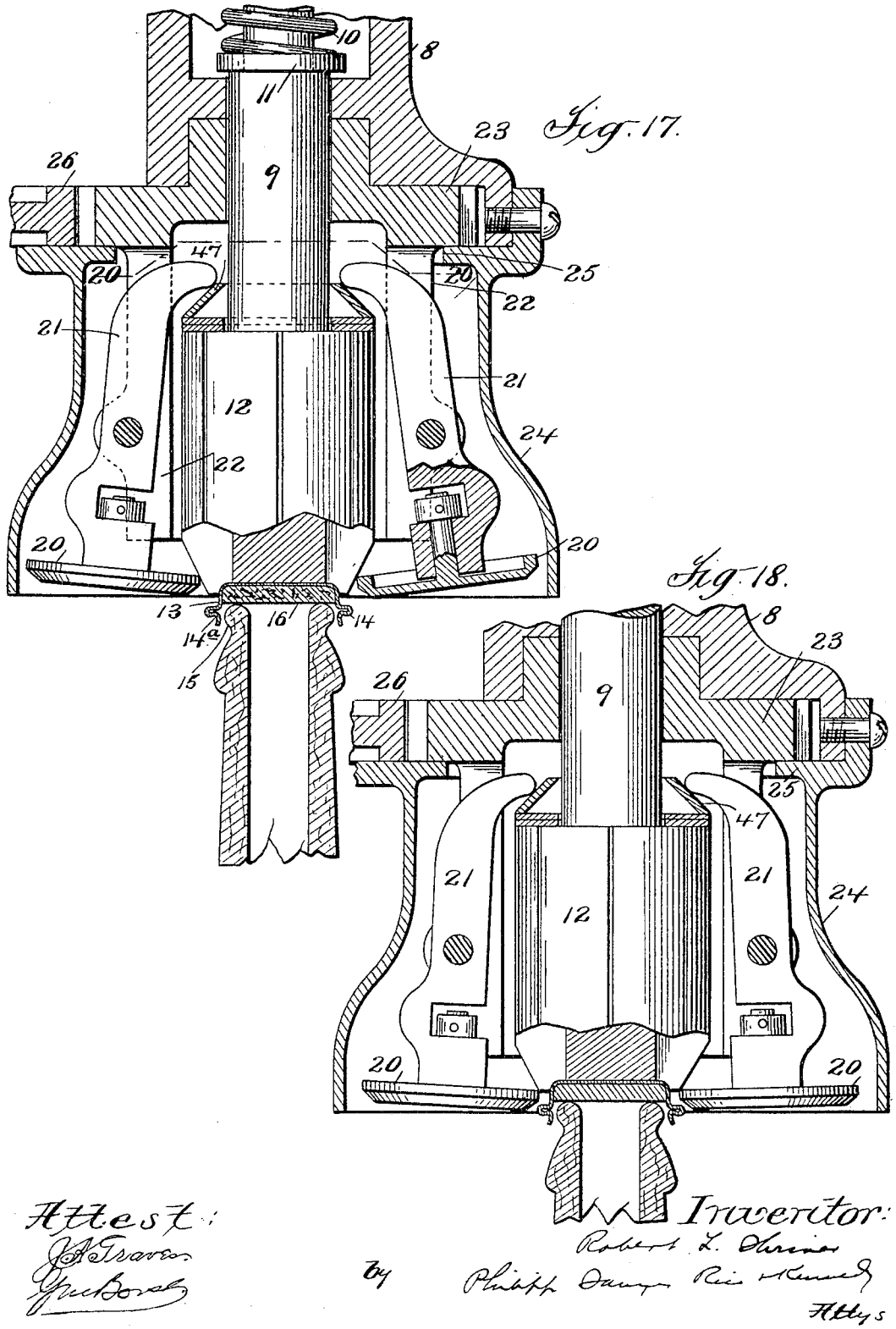

No. 799,095. PATENTED SEPT. 12, 1905.
R. L. SHRINER.
BOTTLE CAPPING MACHINE.
APPLICATION FILED SEPT. 30, 1902.
9 SHEETS—SHEET 9.
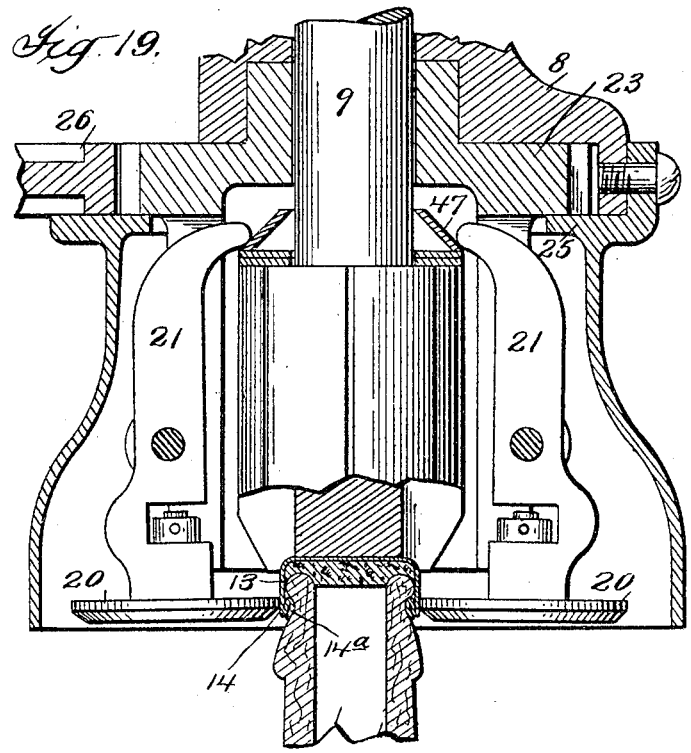
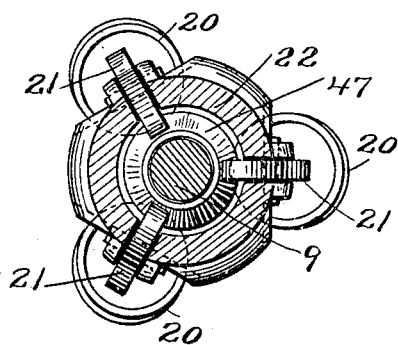
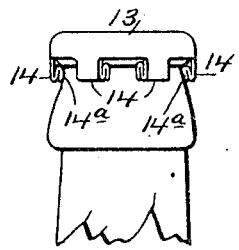

UNITED STATES PATENT OFFICE.

ROBERT L. SHRINER, OF NEW YORK, N. Y., ASSIGNOR TO STANDARD STOPPER COMPANY, OF NEW YORK, N. Y., A CORPORATION OF NEW JERSEY.

BOTTLE-CAPPING MACHINE.

No. 799,095.        Specification of Letters Patent.        Patented Sept. 12, 1905.

Application filed September 30, 1902. Serial No. 125,416.

*To all whom it may concern:*

Be it known that I, ROBERT L. SHRINER, a citizen of the United States, residing at New York city, county of New York, and State of New York, have invented certain new and useful Improvements in Bottle-Capping Machines, fully described and represented in the following specification and the accompanying drawings, forming a part of the same.

This invention relates to improvements in bottle-capping machines—that is to say, machines adapted to bend a portion or portions of a suitably-shaped metal cap into engagement with the neck of a bottle or with a shoulder thereon.

It is the object of the present invention to provide a machine of this class in which the capping mechanism instead of being supplied with bottles and caps by hand is supplied with such bottles and caps by means of rotary carriers, which present the bottles and caps singly in line with the capping mechanism, suitable mechanism being also provided for effecting a relative movement to and from each other of the capping mechanism and each bottle presented whereby the presented bottle is engaged with the presented cap and the bottle with its cap then engaged by the capping mechanism, which secures the cap about the neck of the bottle, the bottle thus capped being then withdrawn from the capping mechanism and on the further rotation of the bottle-carrier removed by hand or automatically from its carrier.

Figure 1:
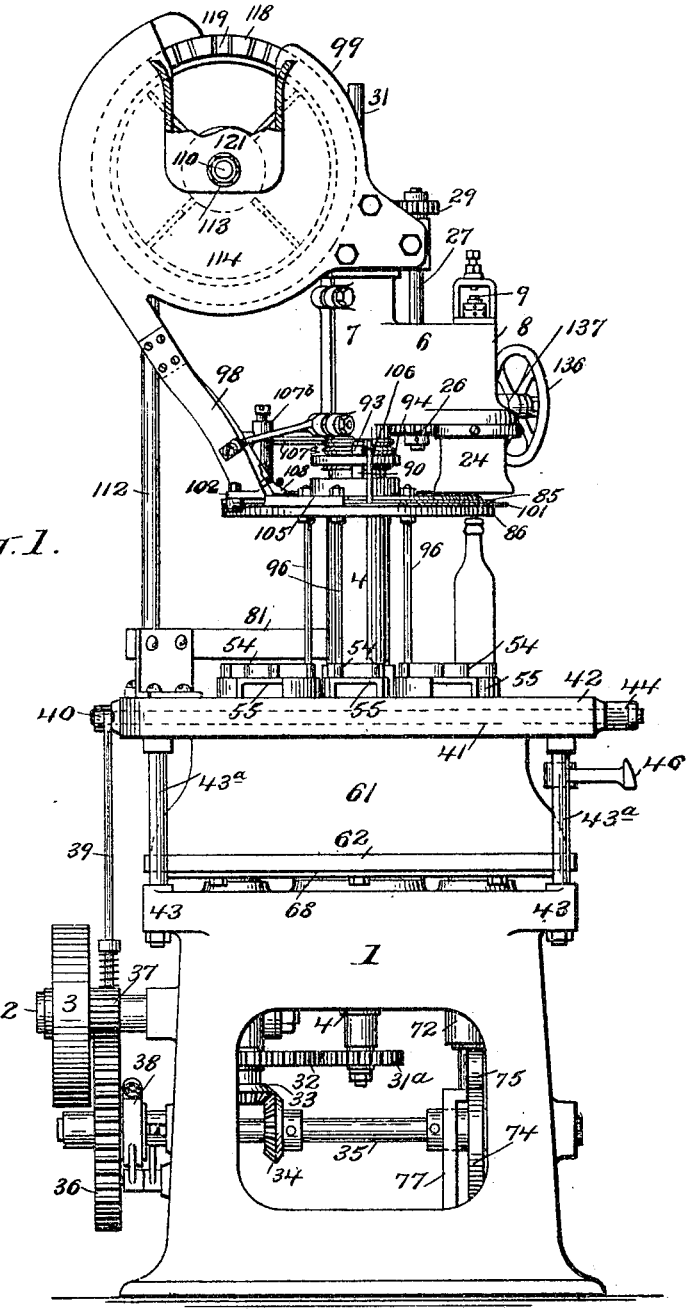
Figure 2:
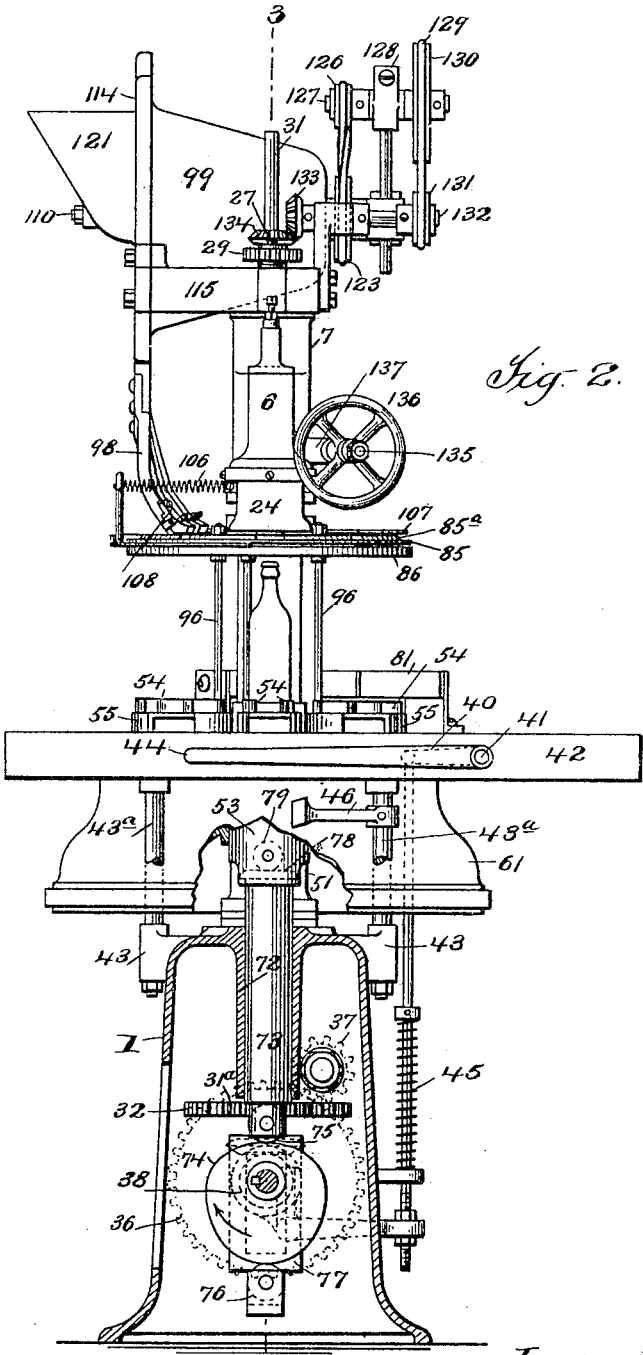
Figure 3:
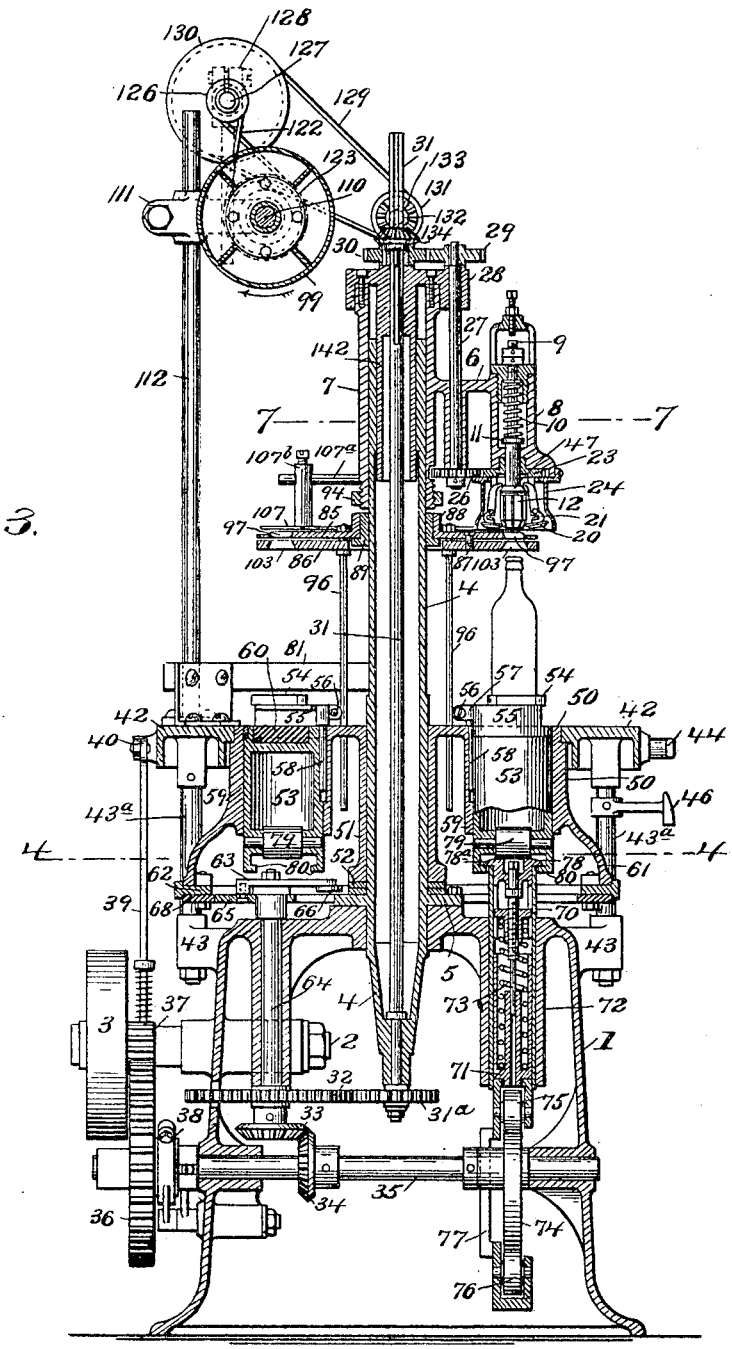
Figure 4:
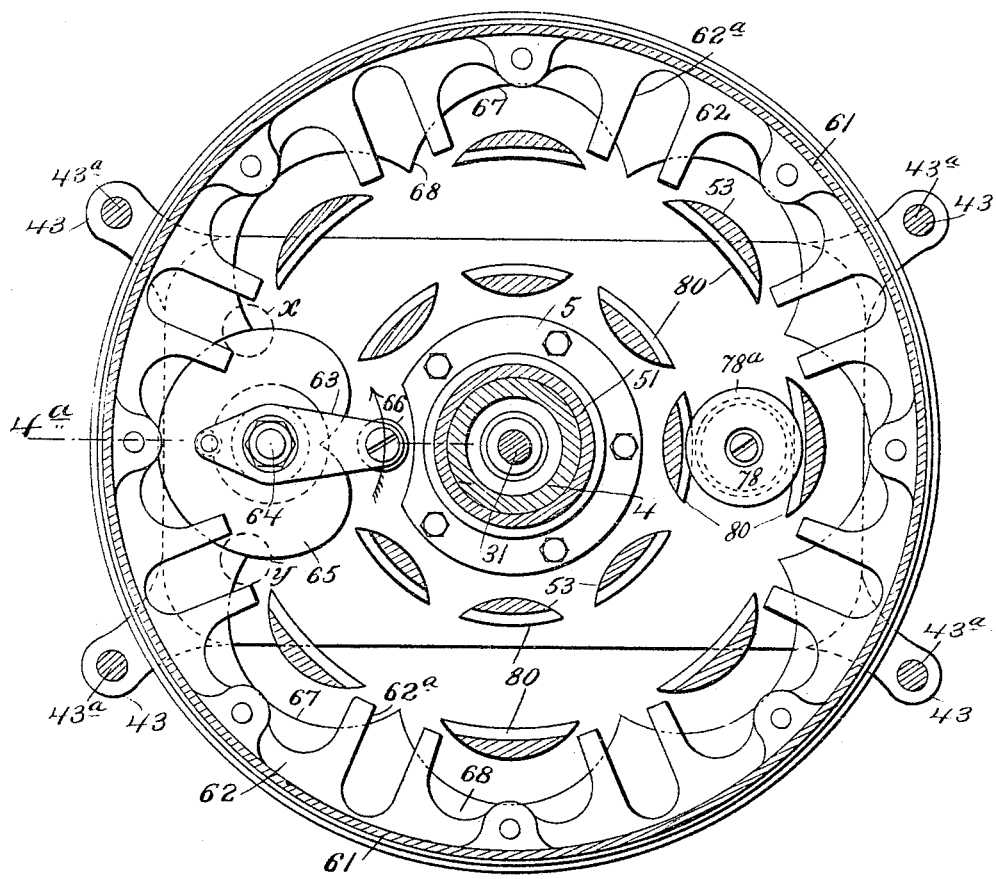
Figure 4A:
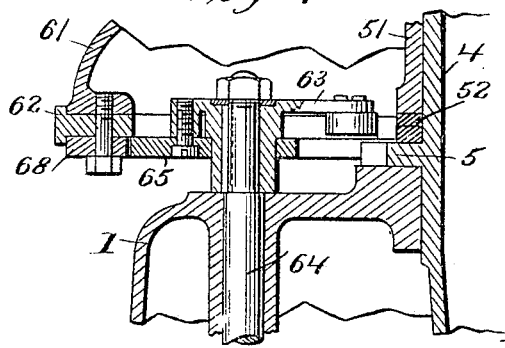
Figure 5:
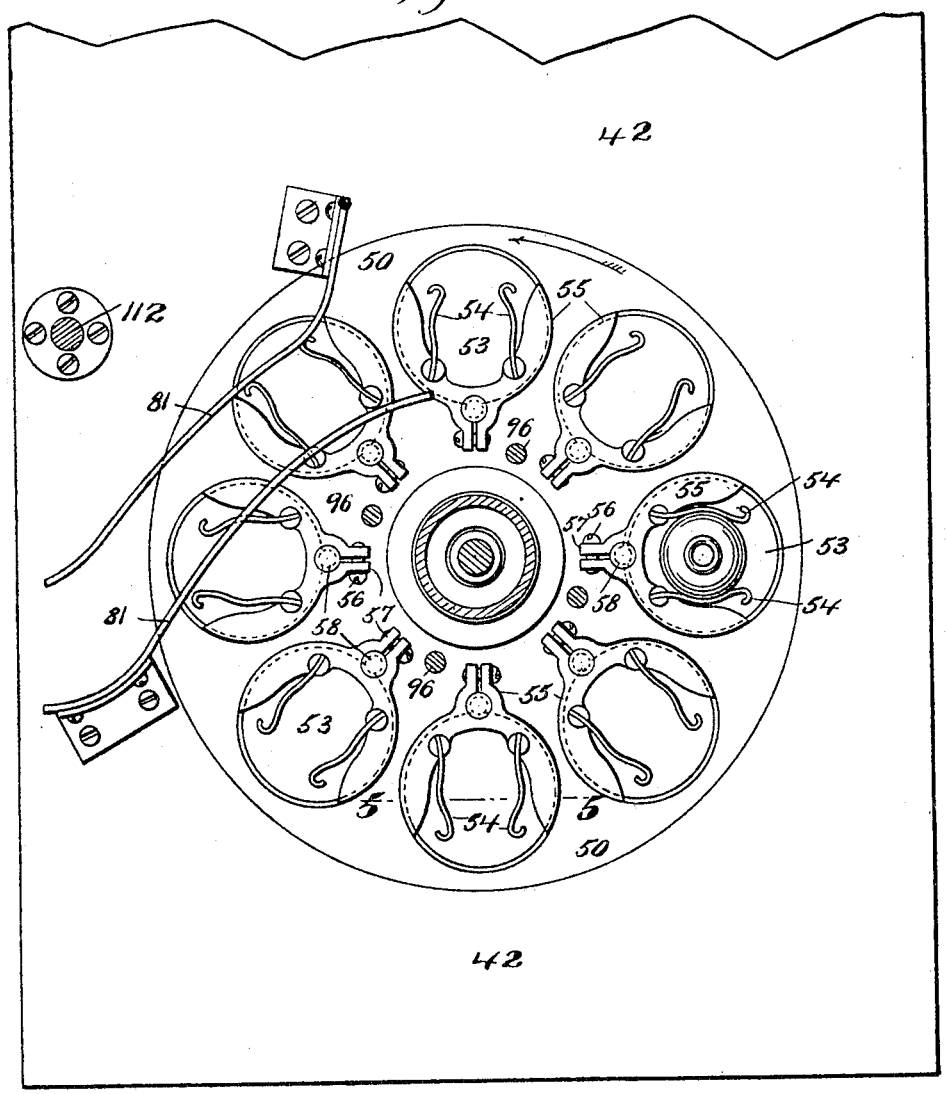
Figure 6:
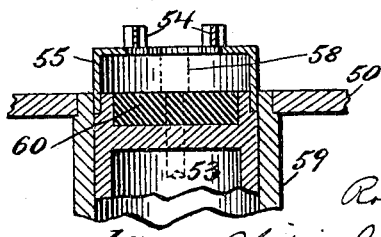

In the accompanying drawings, Figure 1 is a vertical elevation of a capping-machine provided with the several mechanisms before referred to. Fig. 2 is a vertical elevation, partly in section, looking toward the left of Fig. 1. Fig. 3 is a vertical elevation on line 3 of Fig. 2 looking toward the right of said figure. Fig. 4 is a horizontal section, on an enlarged scale, taken through the bottle-carrier and illustrating particularly the means by which it is intermittently rotated. Fig. $4^a$ is a section on the line $4^a$ of Fig. 4. Fig. 5 is a plan view of the bottle-carrier. Fig. 6 is a detail in section of one of the bottle-holders with which the bottle-carrier is provided. Fig. 7 is a horizontal section illustrating the cap-carrier and a portion of the mechanism for feeding caps thereto and also means whereby the capping mechanism and cap-carrier may be adjusted vertically relatively to the bottle-carrier, so as to accommodate bottles of different heights. Fig. $7^a$ is a detail vertical section on the line $7^a$ of Fig. 7. Fig. 8 is a section on the line 8 of Fig. 7. Fig. 9 is a section on the line 9 of Fig. 8. Fig. 10 is a section on the line 10 of Fig. 7. Fig. 11 is a section on the line 11 of Fig. 7. Fig. 12 is a vertical section on the line 12 of Fig. 13, illustrating a magazine for the bottle-caps and means for delivering the caps therefrom into a chute leading to the cap-carrier, as will hereinafter more fully appear. Fig. 13 is a section on the line 13 of Fig. 12. Fig. 14 is a detail, on an enlarged scale and partly in section, of the cap-magazine, illustrating particularly means for insuring the delivery of the caps therefrom into the feeding-chute in proper position—that is to say, right side up. Fig. 15 is a section on the line 15 of Fig. 14. Fig. 16 is a section on the line 16 of Fig. 13. Figs. 17, 18, and 19 are vertical sections illustrating, on an enlarged scale, the capping devices in the different positions assumed by them during the operation of securing a cap to a bottle-neck. Fig. 20 is a section of the same on the line 20 of Fig. 17, and Fig. 21 illustrates a bottle-neck capped by the mechanism illustrated in Figs. 17 to 20.

Referring to said drawings, 1 represents the base of the machine, in which is journaled a driving-shaft 2, driven by a pulley 3 and a belt (not shown) from any suitable source of power. The base 1 of the machine is provided with a central opening, in which is mounted a vertical tube 4, provided with a supporting-flange 5, bearing against the upper side of the base 1. On the upper end of this tube 4 is mounted a bracket 6, provided with a split tubular portion 7, fitting over the upper end of the tube 4, and also with a machine-head 8, in which is mounted the capping mechanism, which will now be described.

Before entering upon a description of this capping mechanism it should be stated that this capping mechanism of itself forms no part of the present invention, as it forms the subject-matter of a separate application filed by me June 5, 1902, Serial No. 110,265. It should also be stated that the present invention, broadly considered, is not to be limited to the particular form of capping mechanism shown, but may and is designed to include any other suitable form of capping mechanism in combination with the other mechanisms shown.

The head 8 contains an endwise-yielding rod 9, passing through openings in the opposite ends of the machine-head and which is normally held in its lowermost position in the machine-head by a spring 10 bearing against the upper end of the machine-head and against a shoulder or enlargement 11 at the lower end of the rod 9. The rod 9 carries at its lower end a bottle-presser or pressing-head 12, having a preferably concave hollow face for engagement with the upper end or lip of a bottle-neck, and a metal cap, as 13, resting thereon and which is secured to the bottle-neck by having radially-extending portions or legs 14 bent downwardly, so that inwardly-bent portions 14$^a$ thereof will engage and interlock with the shoulder 15 upon the bottle-neck. (See Figs. 19 and 21.) When a bottle with a cap 13 thereon is forced upwardly against the pressing-head 12, as illustrated in Figs. 17 to 19, the pressing-head 12 will first engage the cap upon the bottle after the manner illustrated in Fig. 17 and finally (the upward movement of the bottle being continued from this position) force the cap down upon the bottle-neck, with the result that the lip of the bottle will become embedded in the cork or other yielding disk 16 within the cap, as illustrated in Fig. 19. It will be understood, of course, that during this upward movement of the bottle the pressing-head 12 will be moved by the bottle upwardly through the machine-head against the pressure of its spring 10.

With the pressing-head in the position shown in Fig. 19 the bottle and its cap are held securely against turning or other movement, and while so held the radially-projecting portions or legs 14 of the bottle-cap are bent downwardly, thus moving the inwardly-extending portions 14$^a$ of the legs 14 into locking engagement with the shoulder 15 on the bottle-neck by bending devices, which will now be described. These bending devices consist of a series of rolls 20, journaled in the lower ends of levers 21, pivoted in arms 22, depending from a rotary carrier 23, through which the presser-rod 9 passes and which is supported upon the lower end of the machine-head by a hood 24, bolted to the machine-head and inclosing the levers 21 and which is provided with an internal annular flange 25, engaging the under side of the carrier 23, as best shown in Figs. 17, 18, and 19. The carrier 23 is provided with gear-teeth engaged by a pinion 26 upon a vertical shaft 27, journaled at its lower end in the bracket 6 and at its upper end in a cap-piece 28, secured to the tubular portion 7 of bracket 6. At its upper end the shaft 27 is provided with a pinion 29, engaged by a pinion 30, rotating with a vertical shaft 31, passing through the tube 4, the lower end of the shaft 31 being provided with a pinion 31$^a$, connected by gearing 32, 33, and 34 to a horizontal shaft 35, which is in turn connected by gear 36 and pinion 37 with the driving-shaft 2 of the machine. The pinion 30 is splined to spindle or shaft 31, so as to be adjustable vertically thereon, for a purpose which will be hereinafter explained. From these connections it results that while the machine is in operation the vertical shaft 31 is constantly driven and that the carrier 23 with its levers 21 are constantly rotated. The shaft 35 is provided with a clutch mechanism 38, so that it may be connected with and disconnected from the gear 36 and driving-shaft 2, as desired. This clutch is operated by a rod 39 and by arm 40, fast to a rock-shaft 41, provided in a stationary platform or table 42, supported from the brackets 43 on base 1 by legs 43$^a$, and a lever 44, by which shaft 41 is rocked. When lever 44 is depressed by the operator to operate the clutch 38, so as to connect shaft 35 and driving-shaft 2, it is engaged and held in its depressed position against the pressure of a spring 45 on rod 39 by an arm 46, secured to one of the legs 43.

So long as the pressing-head 12 is not engaged and pressed upwardly by a bottle the levers 21 are spread outwardly at their lower ends, substantially as illustrated in Fig. 17. When, however, a bottle engages the pressing-head 12 and forces the same upwardly against the pressure of spring 10, the lower ends of the levers 21 with their bending-rolls 20 are gradually moved inwardly toward each other and toward the bottle-neck, as illustrated in Fig. 18, until they finally assume the position in which they are illustrated in Fig. 19, in which position (the carrier 23 being rotated through the connections just described) they revolve about the bottle-neck and press the radially-extending portions or legs 14 of the bottle-cap downward and force the portions 14$^a$ into locking engagement with the shoulder 15 upon the bottle, as illustrated in Figs. 19 and 21. This movement inwardly toward each other of the lower ends of the cap-bending levers 21 with their rolls 20 is secured by means of a cone-shaped plate or ring 47, which as the presser-head 12 is forced upwardly by the bottle engages the noses or inwardly-turned upper ends of levers 21 and presses the same outwardly, and thus moves or swings their lower ends and the bending-rolls 20 thereon inwardly toward the bottle-neck and into bending engagement with the radial portions or legs 14 of the bottle-cap. This ring 47 is described at length in my prior application before referred to, to which reference is hereby made for a fuller description of the construction, method of operation, and functions of such ring and the other parts of the capping mechanism shown herein.

The mechanism for presenting the bottles singly in line with the capping mechanism and for moving each bottle as thus presented upwardly into engagement with the presser-head 12, so as to force the latter upwardly, and thus bring the bending-rolls 20 into engagement with the radially-projecting portions or legs 14 of the cap, will now be described. This mechanism consists of a rotary carrier 50, provided with a plurality of bottle-holders (hereinafter described in detail) and with a depending tubular portion 51, fitting over the vertical tube 4 and supported by the flanged portion 5 of said tube 4. Between flange 5 and the lower end of such tubular portion 51 of the bottle-carrier are preferably interposed loose annular washers 52, the purpose of which is to provide for free rotation of tube 51 and carrier 50 and at the same time prevent wear of the lower end of tube 51 and flange 5. Each of the bottle-holders consists of a cylindrical bottle rest or support 53, upon which the bottle rests, as shown, and a pair of spring fingers or clips 54, adapted to engage the bottle on opposite sides, so as to hold it firmly in its central position upon the bottle rest or support 53. These spring-fingers 54 are secured to a yoke-shaped bracket 55, recessed to receive the bottle and which is secured to the bottle rest or support 53 by a screw 56, passing through ears 57, located at the rear of the bracket 55 and embracing a pin 58, projecting downwardly through a vertical opening or recess in the outer vertical wall or face of the bottle rest or support 53, as best shown in Fig. 3. The bottle rest or support 53 fits in a tubular chamber 59, formed on the under side of the carrier 50, so as to slide freely therein vertically, rotation of the bottle rest or support 53 within this tubular chamber being prevented by the pin 58, which, as before stated, enters a vertical opening or recess in the outer wall of the bottle rest or support 53 and which also, as best shown in Fig. 3, extends into a like opening or recess on the inner wall or face of the tubular chamber or socket 59. The pin 58 thus serves as a lock, preventing rotation of bottle rest or support 53, and also as a guide for such rest or support in its vertical movements. The bottle rest or support 53 is preferably provided with a seat 60, of suitable cushioning material, upon which the bottle is designed to rest. The carrier 50 may be provided with any suitable number of these bottle-holders equidistant apart, the carrier being intermittently rotated a space equal to the distance between successive bottle-holders, so that all the bottle-holders will be brought successively into position below the capping mechanism upon a complete rotation of carrier 50.

The connections for intermittently rotating the bottle-carrier 50 will now be described. The bottle-carrier 50 is provided with a depending flange 61, to the lower end of which is secured a notched plate 62, having notched portions 62ª, equal in number and in distance apart to the bottle-holders in which the carrier 50 is provided, the notched portions 62ª of said plate 62 alternating with the bottle-holders, as best shown in Fig. 4. These notches 62ª are successively engaged by a crank-arm 63, mounted upon a vertical shaft 64, secured to the pinion 32 and driven by a cam 65, fast to said shaft below crank-arm 63 and to which one end of said crank is connected, as shown in Fig. 4ª. The crank-arm 63 is provided with a bowl 66, adapted to successively enter the notches 62ª of the plate 62, as shown by dotted lines in Fig. 4, so that upon each rotation of the shaft 64 and crank-arm 63 the bottle-carrier 50 will be rotated a distance equal to the space between two notches 62ª and between two bottle-holders, the position of the notches 62ª relatively to the bottle-holders being such, as best illustrated in Fig. 4, that upon the completion of each such partial rotation of the carrier 50 a bottle-holder, with the bottle thereon, will be brought into position beneath and in line with the pressing-head 12 of the capping mechanism. Upon the completion of each such partial rotation of the bottle-carrier 50 it is designed to remain at rest for a length of time sufficient to allow for the movement of the bottle which is in line with the pressing-head 12 upwardly into engagement with the capping mechanism, so as to have the cap properly secured to the neck of the bottle by such capping mechanism. The bottle-carrier 50 is positively stopped or arrested and steadied in this position of rest during this movement of the bottle and during the operation of securing the cap on the neck of the bottle by means of the cam 65, before referred to, secured to the upper end of the vertical shaft 64, which as the bowl 66 of crank-arm 63 leaves a notch 62ª will engage one of a plurality of arc-shaped recesses 67 in a plate 68, secured to the flange 61 below the notched plate 62, and will remain in engagement with such notch, so as to prevent rotation of and steady the bottle-carrier 50 until the bowl 66 enters the next succeeding notch 62ª. The recesses 67 of plate 68 are of the same curvature as cam 65 and are equal in number to the notches 62ª and bottle-holders and alternate with such notches 62ª and are in alinement with the bottle-holders, as best illustrated in Fig. 4.

The mechanism for raising and lowering the bottle-holders, so as to effect the engagement of the bottles thereon with the capping mechanism and the withdrawal of such bottles from engagement with such capping mechanism while the bottle-carrier 50 is at rest, will now be described. This mechanism consists of a two-part tubular plunger 70, mounted so as to move vertically in a tubular chamber 72, formed in the base 1 of the machine. The lower tube 71 of this plunger fits into the tube 70, so as to slide vertically therein, a spring 73 being interposed between the tubes 70 71, as best illustrated in Fig. 3, so that the plunger will yieldingly engage the bottle-holder and when moved upward will press it yieldingly into engagement with the capping mechanism. The plunger is raised, so as to force the bottle-holder upwardly, by means of a cam 74, fast to shaft 35 and engaging a roller 75 upon the lower end of the inner tube 71, and is depressed so as to lower the bottle-holder and bottle away from the capping mechanism by the same cam, which also engages a roller 76 upon the lower end of the bracket 77, secured to the tube 71, as illustrated in Fig. 3. Normally or during rotation of carrier 50 the plunger 70 occupies the depressed position in which it is shown in Fig. 3 and as the bottle-carrier 50 rotates is designed to successively engage the bottle-holders, to then raise each bottle-holder so as to bring the bottle thereon into engagement with the capping mechanism, (see Fig. 19,) and to then positively draw the bottle-holder and its bottle downwardly into the position in which the bottle-holders are shown in Fig. 3. For the purpose of so moving the bottle-holder upwardly the head 78 of the plunger 70 engages the under side of the bottle-support 53 or a roller 79, preferably provided thereon, for the purpose of reducing friction as the support 53 and head 78 come into engagement on the rotation of the carrier. For the purpose of positively lowering the bottle-support 53 and the bottle thereon the head 78 of the plunger 70 is provided with a flange or radially-projecting portion 78$^a$, which is adapted to take over and engage a pair of inwardly-projecting lugs or flanges 80 on the lower end of the bottle-support. (See Figs. 3 and 4.)

From the foregoing it will be understood that as the shaft 35 is rotated by driving-shaft 2 it will, through bevel-pinions 34 33, rotate shaft 64 and also cam 74. As the shaft 64 is thus rotated the crank-arm 63 will engage one of the notches 62$^a$, as shown at $x$, Fig. 4, and remain in engagement therewith during the first half-revolution of shaft 64, thus rotating the bottle-carrier 50 a distance equal to the space between two of its bottle-holders. This partial rotation of bottle-carrier 50 will bring one of the bottle-holders into the position shown in Figs. 3 and 4—that is to say, just beneath and in line with the capping mechanism. As the bottle-holder approaches this position the head 78 of plunger 70 will engage the under side thereof, the flanged portion 79 of the head taking over the inward projections 80 of the bottle-support, as shown in Figs. 3 and 4. As the bottle-holder reaches its position beneath the capping mechanism the bowl 66 of crank-arm 63 will leave the notch 62$^a$, as shown at $y$, Fig. 4, and the cam 65 will simultaneously enter one of the recesses 67, and thereby arrest the movement of the carrier 50. The cam 65 will remain in engagement with this recess during the remaining half-rotation of shaft 64, thereby preventing movement of and steadying carrier 50 with the presented bottle-holder and bottle in proper alinement with the capping mechanism. While the carrier 50 is thus held at rest by the cam or stop 65, the cam 74, rotating with shaft 35, will through the connections before described raise the bottle-rest or support 53 and bring the bottle thereon into engagement with the capping mechanism, which then secures the cap thereon, and then positively lower the bottle-rest and withdraw the bottle from the control of the capping mechanism. At this time the cam 65 will become disengaged from the recess 67, and the bowl 66 will engage the next notch 62$^a$ and during the next half-revolution of shaft 64 rotate bottle-carrier 50 another step, thus moving the capped bottle from beneath the capping mechanism and bringing the next bottle beneath such mechanism, and so on. The capped bottles may be removed from carrier 50 by hand; but they are preferably removed therefrom automatically and deposited upon platform or table 42, from which they are removed as they collect by an attendant. For this purpose the upper face of said platform or table 42 is made flush with the carrier 50 and is provided with a switch or guideway consisting of strips 81 of spring-metal which project obliquely inward over the bottle-carrier 50, so as to engage the capped bottles singly and direct them outwardly onto platform or table 42.

The mechanism for presenting the caps singly in line with the capping mechanism and with the bottles to be capped consists of a rotary carrier made up of two superposed plates 85 86, bolted together, as at 87, (see Fig. 10,) the upper plate 85 being provided with a hub 88, adapted to turn freely upon bushing or sleeve 89, mounted on the tube 4, and which is prevented from turning on said tube 4 by a hanger 90, passing through a vertical opening 91 in the tube 7 of bracket 6 and also through a corresponding opening in the sleeve 89, as best illustrated in Fig. 11. The plates 85 86 of the cap-carrier are supported in proper position above the bottle-carrier and above the bottles carried thereby by the hanger 90, which, as will be observed on reference to Fig. 11, is provided at its lower end with a hook or projection 92, engaging the under side of the plate 85 and at its upper end with a hook or projection 93, resting upon a collar 94, screw-threaded to the tube 7 of bracket 6.

The cap-carrier—i. e., plates 85 86—is rotated by the bottle-carrier 50 through connections consisting of rods 96, secured to the plate 86 and fitting loosely in openings provided in the bottle-carrier 50. The upper plate 85 of the cap-carrier is provided with cap-receiving openings or pockets 97 for the reception of the caps, such openings being equal in number to and registering with the bottle-holders with which the bottle-carrier 50 is provided, so that when a bottle is moved upwardly by the plunger 70, as before described, it will pass through one of the openings or pockets 97 into engagement with the pressing-head 12, as will be understood upon reference to Fig. 3. The lower edges of the pockets 97 of the cap-carrier are provided with annular shoulders 97ᵃ, which serve to retain the caps in the pockets 97 as they receive the caps from the chute 98, which is supplied with such caps from a magazine 99, hereinafter more fully described, the caps being supplied or fed by the chute 98 to such openings by gravity and such supply or feed being controlled by the cap-carrier. The lower end of the chute 98, it will be observed, is in close proximity to the plate 85, said plate being cut away near its edge so as to permit an annular shoulder 85ᵃ, preferably beveled, for engaging the lower end of chute 98 and the foremost cap therein. The foremost cap in chute 98 will thus be engaged by the shoulder 85ᵃ and prevented thereby from movement out of such chute until one of the pockets 97 (empty) registers with such chute, when the foremost cap in the chute will drop into the pocket, as illustrated in Fig. 10, the next succeeding cap being prevented from entering the pocket or leaving the chute 98 until the next succeeding empty pocket 97 comes in line with the chute by engagement with the cap already delivered into the pocket 97 and later by engagement of the shoulder 85ᵃ of the plate 85 with such cap. Below and in line with its pockets 97 the plate 85 is provided with an annular countersunk portion or recess 100 for the reception of a plate 101, secured to a bracket 102 on the under side of the chute 98 and which extends from such chute to a point in close proximity to the capping mechanism, as best shown in Fig. 7. The cap-receiving pockets 97 are somewhat larger in diameter than the caps, and the function of the shoulders 97ᵃ is to engage the radially-projecting portions 14 of the caps and support or maintain the caps in the pockets 97, the caps being prevented from tilting in the pockets by the plate 101 until they reach the capping mechanism, where the plate 101 terminates. The lower plate 86 of the carrier is provided with openings 103, and these openings 103 are of a size adapted for the passage through them of the neck of the bottles when moved upward by the plunger 70. The plate 101 is also provided with an inwardly-extending guide or flange 105, extending inwardly over the cut-away or countersunk upper portion of the plate 85 for a short distance from the chute 98 and provided with a beveled edge fitting against the correspondingly-beveled annular shoulder 85ᵃ of said plate 85, the function of this flange being, as indicated in Fig. 10, to engage the edge of the caps in the pockets 78 immediately after such pockets pass the chute 98 and, if necessary, move them inwardly to proper position in such pockets.

From the foregoing it will be understood that the plates 85 86, constituting the cap-carrier, are rotated by the bottle-carrier 50, so as to present the caps carried thereby singly in line with the capping mechanism, so as to be engaged by the presented bottle when the latter is raised by the plunger 70, that as such cap-carrier is rotated the caps are fed or supplied singly to the pockets 97 therein by gravity from the chute 98, that the caps thus supplied to the receiving-pockets 97 are supported by the shoulders 97ᵃ until they arrive at the capping mechanism, that as they arrive at the capping mechanism the caps passing beyond the plate 101 are in proper position for engagement by the bottles as the latter are moved upward by plunger 70 to the capping mechanism, as heretofore described. It will also be understood that the proper positioning of each cap in the receiving-pockets 97 is insured at starting by the flanged portion 105 of the plate 101, which, as before stated and as illustrated in Figs. 9 and 10, is adapted to engage the head of the cap and to thereby move such cap inwardly, if necessary, in the opening 97. It may sometimes happen either in starting up or through defects in bottles or through failure of the capping mechanism or the plunger 70 to properly operate or because of the absence of bottles from the bottle holders or carrier 50 that some of the pockets 97 after passing beyond the capping mechanism may still retain the caps supplied to them and during the rotation of the cap-carrier become tilted in the pockets 97, so that the projecting portions 14 of the cap will extend below the edge of the plate 101 as the caps approach the chute 98. To permit the passage of such caps past the plate 101, the latter is pivotally connected to the bracket 102, so that it may be swung outwardly by the attendant into such position that it will be engaged by the caps in said pockets 97, or if not so swung out by the attendant may be swung out by the engagement therewith of the caps themselves. The plate 101 is normally held in position between the plates 85 86 with its beveled edge against the shoulder 85ᵃ by a spring 106, connected to said plate 101 and to the hanger 90. In case such caps remain in the pockets 97 of the plate 85 after passing the capping mechanism it is also desirable that some means be provided for preventing such movement of these caps in the pockets 97 as would tend to cause such caps to move off of the shoulders 97ᵃ and to assume a tilted position in such pockets, as if the caps assumed such position they would have a tendency upon reaching the chute 98 and plate 101 to choke and injure the machine. Means for this purpose are provided in the present case consisting of a stationary arc-shaped covering-plate 107, held in position over the openings 97 in plate 85 by a rod 107ᵃ, connected to a post 107ᵇ on plate 107 and to the tube 7, said plate 107 extending from the capping mechanism along the plate 85 to a point in close proximity to the chute 98.

It may sometimes happen, particularly if there be some irregularity in the caps, that a cap may only partially enter one of the pockets 97, leaving a portion thereof still within the chute 98. In such case the carrier might crush such cap and cause it to choke the chute 98 and possibly injure the chute or the carrier itself. To prevent this, the chute 98 is provided on its side next the capping mechanism with a movable portion or gate 108, pivoted to said chute and adapted upon the application of pressure to its under side, as by the engagement of the carrier with a cap projecting partially into one of its pockets 97, to swing outwardly, and thus release this cap from the chute, such gate being held normally in closing position by a spring 109, connected thereto and to the opposite side of the chute.

The magazine 99, in which the caps are stored, will now be described, together with the means therein whereby the caps are delivered therefrom in proper position—that is to say, right side up—into the chute 98. This magazine consists of a rotating drum or cylinder 99, rotatably mounted upon a shaft 110, journaled at one end in a bracket 111, adjustably secured to a standard 112, supported from the platform 42 of the machine, and at its other end in a bearing 113, provided in a face-plate 114, secured to and supported from an extension 115 of the cap 28 of the tube 7. The face-plate 114 is stationary and is provided with a flange 116, against which the outwardly-flaring edge or flange 117 of the drum abuts, as illustrated in Figs. 12 and 13. This flanged portion 117 of the drum 99 is provided with a selecting-ring 118, having spaces or channels 119 of peculiar form, so that the caps can only pass therethrough when presented to the channels in the position illustrated in Fig. 15. As the drum 99 is rotated in the direction indicated by the arrow in Fig. 13, such caps as enter the channels 119 in the selecting-ring 118 will pass therefrom into a passage 120 provided in the face-plate 114, and which leads into the chute 98, as best illustrated in Fig. 13. The caps are supplied to the rotating drum 99 at the end thereof next the face-plate 114, a funnel 121 being preferably formed in said face-plate through which such caps may be conveniently introduced into the drum 99. The drum 99 is rotated by means of a belt 122, passing over a pulley 123, keyed to the hub 124 of the sleeve 125, to which said drum is secured, (see Fig. 12,) this belt 122 passing over a pulley 126, secured to a shaft 127, journaled in a bearing 128, projecting upwardly from bracket 111. Shaft 127 is in turn driven by a belt 129, passing over a pulley 130 on said shaft 127 and around a pulley 131 upon a shaft 132, which is provided at its opposite end with a bevel-pinion 133, in gear with a bevel-pinion 134, keyed to pinion 30, which, as before stated, is splined to and rotated by the vertical shaft 31 and movable vertically thereon. From this construction it results that throughout the operation of the machine the drum 99 is constantly rotated by the shaft 31 through the connections just described, and the caps stored in said drum are delivered therefrom by the selecting-ring 118 into the passage 120 in the face-plate 114, and thence into the chute 98, which is thus kept constantly supplied with such caps and feeds them by gravity to the cap-carrier. This chute extends vertically for a short distance and is then turned inwardly in an oblique direction, as shown in Fig. 2, so as to present the caps right side up to the cap-carrier, as shown.

The machine illustrated in the drawings is not limited in its operations to any particular length of bottle, but is designed to operate upon bottles of different lengths. In order to adapt the machine for operation upon such bottles of different lengths, it is necessary, of course, that the cap-carrier and the capping mechanism should be adjustable relatively to the bottle-carrier 50. Such adjustment is provided for in the present case, the capping mechanism, as before described, being mounted in the bracket 6, which is in turn carried by the tube 7, which fits over and is supported by the vertical tube 4 of the machine. This tube 7 is adjustable vertically on the tube 4 to and from the bottle-carrier 50 by means of a shaft and hand-wheel 135 136, said shaft being journaled in bearings 137 138 in the bracket 6 and provided with a worm 139, engaging a worm-wheel 140, journaled in bearings in tube 7 (see Fig. 7) and which projects through an opening in the tube 7 into engagement with a rack 141, formed upon the tube 4. The cap 28, to which the tube is secured, is provided with a guiding-sleeve 142, through which the shaft or spindle 31 passes and which in turn enters the tube 4, as illustrated in Figs. 3 and 7ª. As the shaft 135 is rotated the worm-wheel 139 will turn pinion 140, and as the tube 4 is vertically immovable said pinion will travel along the rack 141 on the tube 4, whereby the bracket 6 and capping mechanism mounted thereon are raised or lowered, as the case may be, from or toward the bottle-carrier 50, and as the bracket 6 is so moved the capping mechanism and plates 85 86 are caused to move therewith by reason of the connection of such cap-carrier and plates with the tube 7 by the hanger 90, as heretofore described. It will thus be seen that the capping mechanism and cap-carrier may be adjusted to any desired position relatively to the bottle-carrier 50. As the bracket 6 and tube 7 are thus adjusted vertically upon the tube 4, the drum 99 and face-plate 114, together with the connections for rotating said drum, are also adjusted vertically by reason of the support of said drum and driving connections from the cap 28, as before described. When the drum 99 is being thus adjusted vertically, the bracket 111 will be loosened, so as to move freely along the standard 112, such bracket being again secured firmly to said standard in the position to which it is moved thereon during such adjustment.

What I claim is—

1. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, and means whereby the capping mechanism and each bottle and its cap as thus presented are brought into engagement, substantially as described.

2. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, and means for automatically supplying caps to the cap-carrier, substantially as described.

3. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, and means whereby each bottle as presented is moved endwise into engagement with its cap and the capping mechanism, substantially as described.

4. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby each bottle as presented is moved endwise into engagement with its cap and the capping mechanism, and means for automatically supplying caps to the cap-carrier, substantially as described.

5. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, and means for automatically removing the capped bottles from the bottle-carrier as the latter rotates, substantially as described.

6. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, means for automatically removing the capped bottles from the bottle-carrier as the latter rotates, and means for automatically supplying caps to the cap-carrier, substantially as described.

7. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, and means whereby each bottle as presented is moved endwise into engagement with its cap and the capping mechanism, and means for automatically removing the capped bottles from the bottle-carrier as the latter rotates, substantially as described.

8. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby each bottle as presented is moved endwise into engagement with its cap and the capping mechanism, means for automatically removing the capped bottles from the bottle-carrier as the latter rotates, and means for automatically supplying caps to the cap-carrier, substantially as described.

9. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, and means whereby the capping mechanism and each bottle and its cap as thus presented are brought into engagement, said capping mechanism and cap-carrier being adjustable to and from the bottle-carrier to accommodate bottles of different lengths, substantially as described.

10. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, and means for automatically supplying caps to the cap-carrier, said capping mechanism, cap-carrier and cap-supplying means being adjustable to and from the bottle-carrier to accommodate bottles of different lengths, substantially as described.

11. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, and means whereby the capping mechanism and each bottle and its cap as thus presented are brought into engagement, said capping mechanism and cap-carrier being connected together and simultaneously adjustable to and from the bottle-carrier to accommodate bottles of different lengths, substantially as described.

12. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, and means for automatically supplying caps to the cap-carrier, said capping mechanism, cap-carrier and cap-supplying means being connected together and simultaneously adjustable to and from the bottle-carrier to accommodate bottles of different lengths, substantially as described.

13. The combination with a relatively stationary capping mechanism, a bottle-support and means whereby the capping mechanism and the bottle on said support are brought into engagement, of a magazine for caps, a chute leading therefrom, and a rotary cap-carrier for receiving the caps from the chute and presenting and supporting them singly in line with and between the capping mechanism and bottle, substantially as described.

14. The combination with a relatively stationary capping mechanism, a bottle-support and means whereby the capping mechanism and the bottle on said support are brought into engagement, of a magazine for caps, a chute leading therefrom, and a rotary cap-carrier for receiving the caps from the chute and presenting and supporting them singly in line with and between the capping mechanism and bottle, said cap-carrier being provided with pockets for receiving the caps from said chute and engaging said chute so as to prevent the discharge of a cap therefrom except when one of its empty pockets is in line with the chute, substantially as described.

15. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, said carrier comprising an upper member provided with pockets each adapted to loosely contain and support a cap and for the passage of the bottle-neck, and a lower member provided with openings registering with the pockets on the upper member to permit the passage of the bottle-neck, substantially as described.

16. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, said carrier comprising an upper member provided with pockets each adapted to loosely contain and support a cap and for the passage of the bottle-neck, a lower member provided with openings registering with the pockets on the upper member and to permit the passage of the bottle-neck, and means between said two members whereby the caps are prevented from tilting or leaving their supports in the pockets in the upper member until the caps approach the capping mechanism, substantially as described.

17. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, said carrier comprising an upper member provided with pockets each adapted to loosely contain and support a cap and for the passage of the bottle-neck, a lower member provided with openings registering with the pockets on the upper member to permit the passage of the bottle-neck, and a plate between said two members whereby the caps are prevented from tilting or leaving their supports in the pockets in the upper member until the caps approach the capping mechanism, substantially as described.

18. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle-magazine and chute for supplying caps to said carrier, said carrier comprising an upper member provided with pockets each adapted to loosely contain and support a cap and for the passage of the bottle-neck, and a lower member provided with openings registering with the pockets on the upper member to permit the passage of the bottle-neck, substantially as described.

19. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle and a magazine and chute for supplying caps to said carrier, said carrier comprising an upper member provided with pockets each adapted to loosely contain and support a cap and for the passage of the bottle-neck, a lower member provided with openings registering with the pockets on the upper member to permit the passage of the bottle-neck, and means between said two members and extending from said chute into close proximity to the capping mechanism, whereby the caps are prevented from tilting or leaving their supports in the pockets in the upper member until the caps approach the capping mechanism, substantially as described.

20. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, a magazine and chute for supplying caps to said carrier, said carrier comprising an upper member provided with pockets each adapted to loosely contain and support a cap and for the passage of the bottle-neck, a lower member provided with openings registering with the pockets on the upper member to permit the passage of the bottle-neck, and a plate between said two members and extending from said chute into close proximity to the capping mechanism whereby the caps are retained in position in the pockets in the upper member until the caps approach the capping mechanism, substantially as described.

21. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, a magazine and chute for supplying caps to said carrier, said carrier comprising an upper member provided with pockets each adapted to loosely contain and support a cap and for the passage of the bottle-neck, a lower member provided with openings registering with the pockets on the upper member to permit the passage of the bottle-neck, and radially-yielding means between said two members and extending from said chute into close proximity to the capping mechanism, whereby the caps are retained in position in the pockets in the upper member until the caps approach the capping mechanism, substantially as described.

22. The combination with a relatively stationary capping mechanism, a bottle-support and means whereby the capping mechanism and the bottle on said support are brought into engagement, of a rotary cap-carrier for presenting and supporting caps singly in line with and between the capping mechanism and bottle, a magazine and chute for supplying caps to said carrier, said carrier comprising an upper member provided with pockets each adapted to loosely contain and support a cap and for the passage of the bottle-neck, a lower member provided with openings registering with the pockets on the upper member to permit the passage of the bottle-neck, and a radially-yielding pivoted plate between said two members and extending from said chute into close proximity to the capping mechanism, whereby the caps are retained in position in the pockets on the upper member until the caps approach the capping mechanism, substantially as described.

23. The combination with a relatively stationary capping mechanism, of a rotary bottle-carrier for presenting bottles singly in line with the capping mechanism, said carrier being provided with an independent endwise-movable support for each bottle, and means for moving said supports endwise as they aline with the capping mechanism so as to engage the bottles carried thereby with said capping mechanism, substantially as described.

24. The combination with a relatively stationary capping mechanism, of a rotary bottle-carrier for presenting bottles singly in line with the capping mechanism, said carrier being provided with an independent endwise-movable support for each bottle, and means for moving said supports endwise as they aline with the capping mechanism so as to engage the bottles carried thereby with said capping mechanism and for then positively moving the bottle-support and bottle in the opposite direction, substantially as described.

25. The combination with a relatively stationary capping mechanism, of a rotary bottle-carrier for presenting bottles singly in line with the capping mechanism, said carrier being provided with an independent endwise-movable support for each bottle, a cap-carrier for presenting and supporting caps singly in line with and between the capping mechanism and the bottles thus presented, and means for moving said supports endwise as they aline with the capping mechanism so as to engage the bottles carried thereby with said capping mechanism, substantially as described.

26. The combination with a relatively stationary capping mechanism, of a rotary bottle-carrier for presenting bottles singly in line with the capping mechanism, said carrier being provided with an independent endwise-movable support for each bottle having spring-fingers for engaging the bottle on opposite sides, and means for moving said supports endwise as they aline with the capping mechanism so as to engage the bottles carried thereby with the capping mechanism, substantially as described.

27. The combination with a relatively stationary capping mechanism, of a rotary bottle-carrier for presenting bottles singly in line with the capping mechanism, said carrier being provided with an independent endwise-movable support for each bottle, and means for moving said supports endwise as they aline with the capping mechanism so as to engage the bottles carried thereby with said capping mechanism, said means comprising a plunger in two parts adapted to slide one upon the other, with a spring between them, substantially as described.

28. The combination with a relatively stationary capping mechanism, of a rotary bottle-carrier for presenting bottles singly in line with the capping mechanism, said carrier being provided with an independent endwise-movable support for each bottle, and means for moving said supports endwise as they aline with the capping mechanism so as to engage the bottles carried thereby with said capping mechanism, said means comprising a plunger having a part adapted to positively interlock with each bottle-support as it alines with the capping mechanism, substantially as described.

29. The combination with a relatively stationary capping mechanism, a rotary bottle-support and means whereby the capping mechanism and the bottle on said support are brought into engagement, of a rotary cap-carrier for presenting and supporting caps singly in line with and between the capping mechanism and bottle, said carrier comprising an upper member provided with pockets each adapted to loosely contain and support a cap and for the passage of the bottle-neck, a lower member provided with openings registering with the pockets on the upper member to permit the passage of the bottle-neck, and means extending from the capping mechanism to the chute for covering the pockets in the carrier and preventing displacement of such caps as may remain therein after leaving the capping mechanism, substantially as described.

30. The combination with a relatively stationary capping mechanism, a rotary bottle-support and means whereby the capping mechanism and the bottle on said support are brought into engagement, of a rotary cap-carrier for presenting and supporting caps singly in line with and between the capping mechanism and bottle, said carrier comprising an upper member provided with pockets each adapted to loosely contain and support a cap and for the passage of the bottle-neck, a lower member provided with openings registering with the pockets on the upper member to permit the passage of the bottle-neck, and a plate extending from the capping mechanism to the chute for covering the pockets in the carrier and preventing displacement of such caps as may remain therein after leaving the capping mechanism, substantially as described.

31. The combination with a relatively stationary capping mechanism, of a rotary bottle-carrier for presenting bottles singly in line with the capping mechanism, a rotary cap-carrier for presenting and supporting caps singly in line with and between said capping mechanism and the bottles thus presented, means whereby the capping mechanism and each bottle and its cap as thus presented are brought into engagement, and means for automatically removing the capped bottles from the bottle-carrier as the latter rotates, said means comprising a switch extending over the cap-carrier and having yielding walls for engaging the bottles singly on opposite sides, substantially as described.

In testimony whereof I have hereunto set my hand in the presence of two subscribing witnesses.

ROBERT L. SHRINER.

Witnesses:
   HENRY U. RANKEL,
   E. R. HARTY.